(12) United States Patent
Chen et al.

(10) Patent No.: US 8,498,339 B2
(45) Date of Patent: Jul. 30, 2013

(54) VIDEO PROCESSING APPARATUS AND RELATED METHOD TO DETERMINE MOTION VECTOR

(75) Inventors: Chung-Yi Chen, Nantou County (TW); Su-Chun Wang, Taipei County (TW)

(73) Assignee: MStar Semiconductor, Inc., ChuPei, Hsin-Chu Hsien (TW)

( * ) Notice: Subject to any disclaimer, the term of this patent is extended or adjusted under 35 U.S.C. 154(b) by 1201 days.

(21) Appl. No.: 12/122,732

(22) Filed: May 19, 2008

(65) Prior Publication Data
US 2009/0195698 A1 Aug. 6, 2009

(30) Foreign Application Priority Data
Feb. 4, 2008 (TW) ................................ 97104193 A

(51) Int. Cl.
*H04N 7/26* (2006.01)
(52) U.S. Cl.
USPC ............ 375/240.16; 375/240.23; 375/240.29
(58) Field of Classification Search
USPC ............. 375/240.24, 240.1–240.16; 348/699
See application file for complete search history.

(56) References Cited

U.S. PATENT DOCUMENTS

| | | | |
|---|---|---|---|
| 6,501,794 B1 * | 12/2002 | Wang et al. | 375/240.08 |
| 7,185,277 B1 * | 2/2007 | Bernstein et al. | 715/210 |
| 8,144,247 B2 * | 3/2012 | Kim et al. | 348/452 |
| 2003/0031257 A1 * | 2/2003 | Yoshida et al. | 375/240.16 |
| 2007/0140346 A1 * | 6/2007 | Chen et al. | 375/240.16 |
| 2007/0147506 A1 * | 6/2007 | Kwon et al. | 375/240.16 |
| 2008/0101472 A1 * | 5/2008 | Jeon et al. | 375/240.16 |
| 2009/0147132 A1 * | 6/2009 | Sato et al. | 348/451 |
| 2009/0244388 A1 * | 10/2009 | Lin et al. | 348/699 |
| 2010/0166071 A1 * | 7/2010 | Wu et al. | 375/240.16 |

\* cited by examiner

*Primary Examiner* — Hassan Kizou
*Assistant Examiner* — Emmanuel Maglo
(74) *Attorney, Agent, or Firm* — Winston Hsu; Scott Margo

(57) ABSTRACT

The invention provides a video processing method, which includes: performing motion estimation upon the target image block and a plurality of reference image blocks to calculate a plurality of block matching differences; determining a minimum block matching difference from the plurality of the block matching differences; comparing the minimum block matching difference with at least one of the reference block matching differences to obtain at least a comparison result; and according to the at least a comparison result, selectively determining a target motion vector of the target image block referred to a motion vector of at least a neighboring image block of the target image block or a motion vector corresponding to the minimum block matching difference.

7 Claims, 7 Drawing Sheets

VIDEO PROCESSING APPARATUS AND RELATED METHOD TO DETERMINE MOTION VECTOR

BACKGROUND OF THE INVENTION

1. Field of the Invention

The present invention relates to a video processing method, and more particularly, to a video processing device and related method for determining a target motion vector according to a calculated block matching difference.

2. Description of the Prior Art

The conventional video processing method selects a motion vector corresponding to a minimum block matching difference as a target motion vector when estimating the motion vector of each target image block; however, in certain special situations, such as when a plurality of similar/same patterns appear on a corresponding image, the conventional video processing method may not be able to determine a real motion vector as the target motion vector. This is because the conventional video processing method would find a plurality of reference image blocks corresponding to the similar/same patterns, and therefore the individual block matching differences generated between the reference image blocks and the target image block are very similar (or parts of them are the same). So even if a minimum difference can be found from the block matching differences, the motion vector corresponding to the minimum block matching difference cannot be sure to be the real motion direction of the image object corresponding to the target image block. The target motion vector found in this method may not be a real motion vector. If the non-real target motion vector found in the above-mentioned method is used to (the motion vector corresponding to the minimum difference value) perform a motion interpolation, then the motion interpolation may be wrong and the quality of the image may be lowered.

SUMMARY OF THE INVENTION

It is therefore one of the objectives of the present invention to provide a video device and related method capable of detecting a block matching difference similar to a minimum block matching difference, and capable of selectively determining a target motion vector according to another method when detecting a close block matching difference in order to solve the above-mentioned problem.

According to one embodiment, the present invention discloses a video processing method. The video processing method comprises: performing motion estimation upon the target image block and a plurality of reference image blocks to calculate a plurality of block matching differences; determining a minimum block matching difference from the plurality of the block matching differences; comparing the minimum block matching difference with at least one of the reference block matching differences to obtain at least a comparison result; and according to the at least a comparison result, selectively determining a target motion vector of the target image block referred to a motion vector of at least a neighboring image block of the target image block or a motion vector corresponding to the minimum block matching difference.

According to one embodiment, the present invention further discloses a video device. The video processing device comprises: a motion estimation circuit, for performing motion estimation upon a target image block and a plurality of reference image blocks to calculate a plurality of block matching differences, and determining a minimum block matching difference; a comparison circuit, coupled to the motion estimation circuit, for comparing the minimum block matching difference and at least one of the reference block matching differences to obtain at least a comparison result; and a decision circuit, coupled to the comparison circuit, for according to the comparison result, selectively determining a target motion vector of the target image block referred to a motion vector of at least a neighboring image block of the target image block or a motion vector corresponding to the minimum block matching difference.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
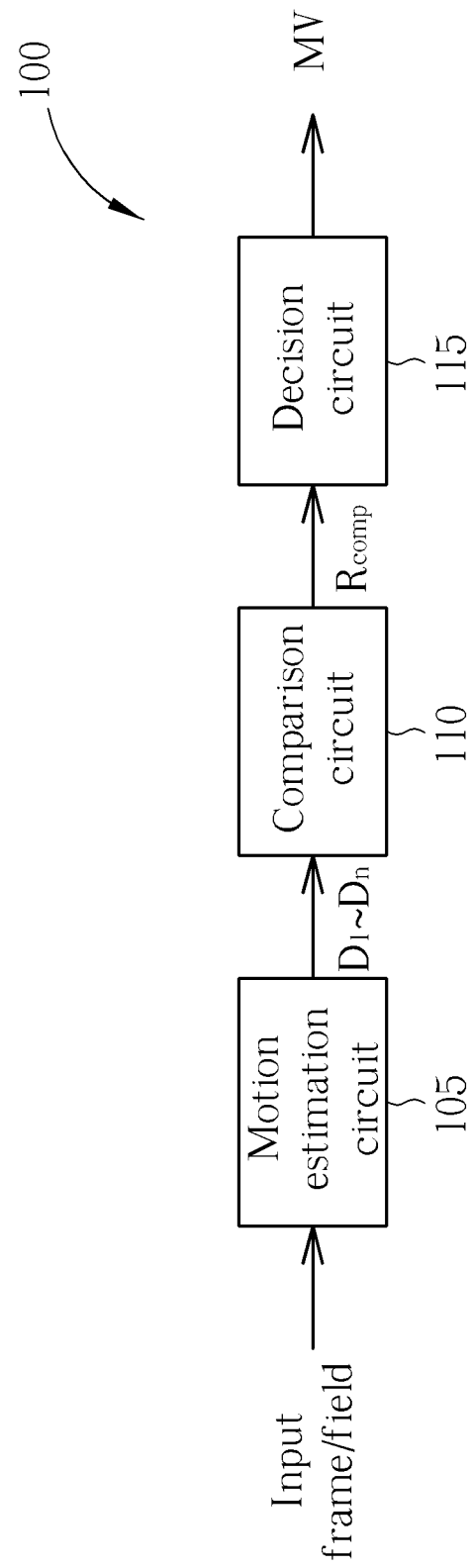
FIG. 1 is a diagram of a video processing device according to an embodiment of the present invention.
Figure 2:
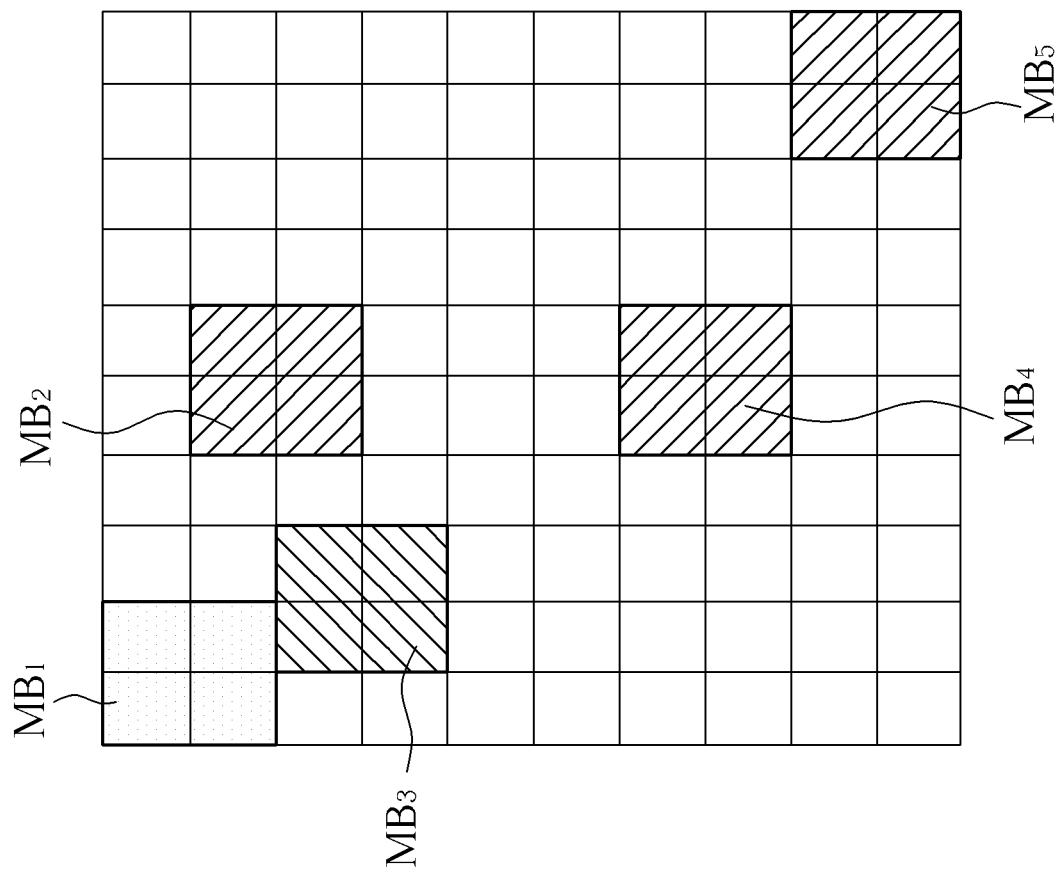
FIG. 2 is an exemplary diagram of the video processing device shown in FIG. 1 performing full-search block matching.
Figure 2:
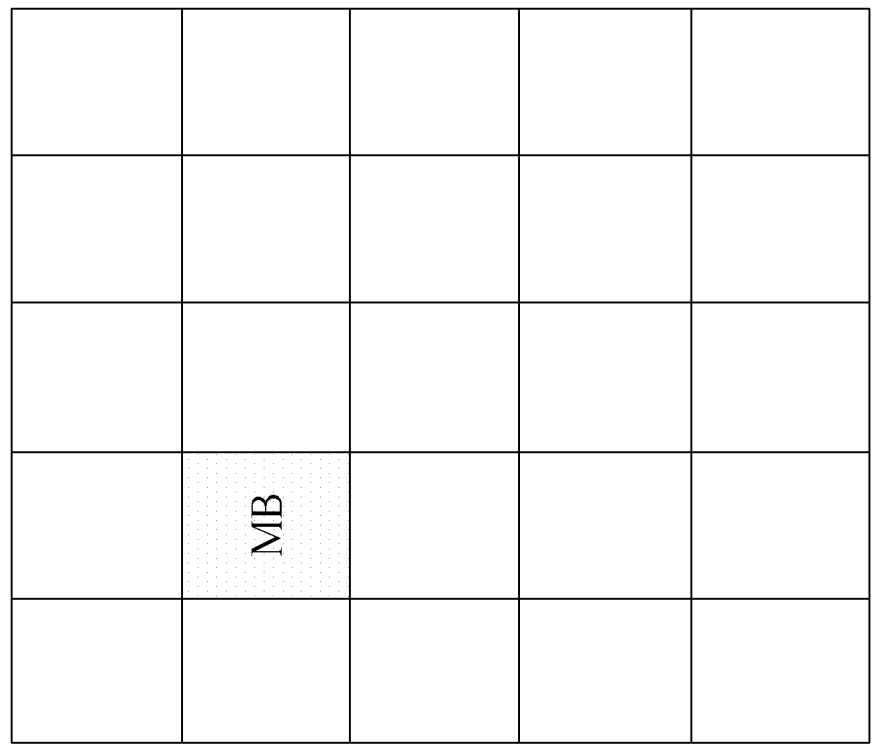

Please refer to FIG. 1. FIG. 1 is a diagram of a video processing device 100 according to an embodiment of the present invention. The video processing device 100 comprises: a motion estimation circuit 105, a comparison circuit 110 and a decision circuit 115. The motion estimation circuit 105 is used for performing motion estimation upon a target image block MB and a plurality of reference image blocks $MB_1 \sim MB_n$ (i.e. the possible reference image blocks in all directions) to calculate a plurality of block matching differences $D_1 \sim D_n$, and determine a minimum block matching difference $D_{min}$ from the plurality of block matching differences $D_1 \sim D_n$, wherein the reference image blocks $MB_1 \sim MB_n$ and the target image block MB are positioned in a different frame/field. For a detailed description of this method, please refer to FIG. 2. FIG. 2 is a diagram of the video processing device 100 performing the full-search block matching shown in FIG. 1. As the image (frame/field) is shown in the left-hand side of FIG. 2, the motion estimation circuit 105 is used for performing a block matching search on the target image block MB and any reference image block of another image (frame/field) shown in the right-hand side of FIG. 2, for example, the reference image blocks $MB_1 \sim MB_5$ in the position shown in the figure. The motion estimation circuit 105 is capable of individually calculating block matching differences $D_1 \sim D_5$. The processing method of calculating the motion vector in this invention can be for finding the block of the reference image blocks that is the most similar to the target image frame/field, and the searching range can either be full frames/ fields, or merely the predefined range corresponding to the target block in the reference frame/field. Under the situations of considering the amount of calculations required, the optically similar definition means that the sum of absolute difference (SAD) of the two blocks is a minimum value. The algorithm is as follows:

$$SAD(i, j) = \sum_{k=0}^{N-1} \sum_{l=0}^{N-1} |C(x+k, y+l) - R(x+i+k, y+j+l)| \quad -p \le i, j \le p$$

the motion vector is (m,n), making SAD minimal when i=m, j=n, wherein
 (1) N represents the length and width of the block;
 (2) C(x+k,y+l) represents the point of the target image block in the target image frame/field;
 (3) R(x+i+k,y+j+l) represents the point of the reference image block in the reference image frame/field;
 (4) p represents the searching range.

The comparison circuit 110 is used for comparing the minimum block matching difference $D_{min}$ with at least a reference block matching difference $D_1 \sim D_n$ to obtain at least a comparison result $R_{comp}$, wherein the position of the image block corresponding to the minimum reference block matching difference is outside a first range corresponding to the position of the image block of the minimum block matching difference $D_{min}$. That is, the comparison circuit 110 compares the minimum block matching difference $D_{min}$ with the reference block matching difference related to the position outside a first range corresponding to the position of the image block in order to obtain the comparison result $R_{comp}$. The decision circuit 115 is used for selectively referring to the motion vector of at least a neighboring image block of the target image block MB according to the comparison result $R_{comp}$ to determine a target motion vector MV of the target image block MB or for selecting the motion vector corresponding to the minimum block matching difference $D_{min}$ as the target motion vector MV of the target image block MB.

The motion estimation circuit 105 is used for performing motion estimation upon a target image block MB and a plurality of reference image blocks $MB_1 \sim MB_n$ (i.e. the possible reference image blocks in all directions) to calculate a plurality of block matching differences $D_1 \sim D_n$, and determining a minimum block matching difference $D_{min}$ from the plurality of the block matching differences $D_1 \sim D_n$, wherein the reference image blocks $MB_1 \sim MB_n$ and the target image block MB are positioned in a different frame/field and the position of the image block corresponding to the minimum reference block matching difference is outside a first range of the minimum block matching difference $D_{min}$. According to the comparison, the target motion vector is selectively referred the motion vector of at least a neighboring image block of the target image block or the motion vector corresponding to the minimum block matching difference.

Figure 3:
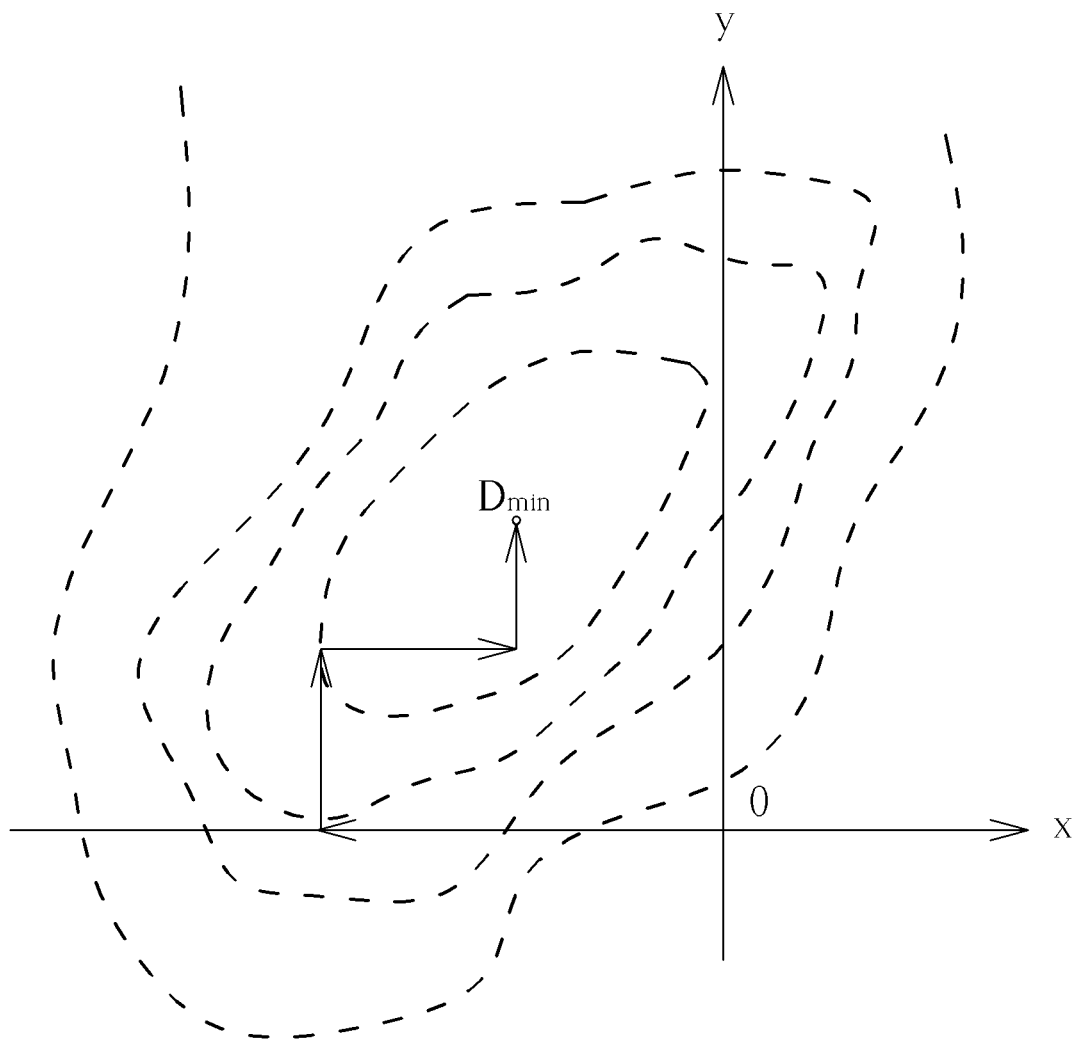
FIG. 3 is a contour diagram formed according to the calculated block matching difference.
Figure 4:
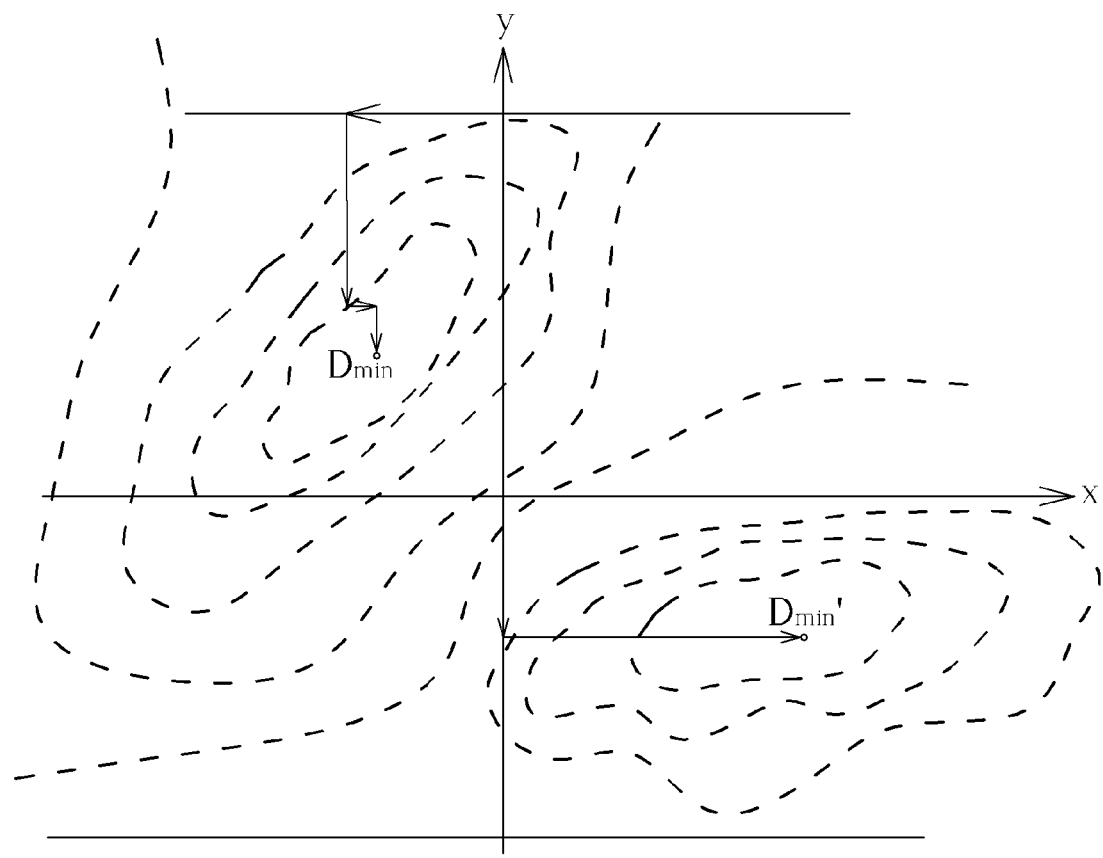
FIG. 4 is a contour diagram formed according to the calculated block matching difference in another embodiment.

Please refer to FIG. 3 and FIG. 4. FIG. 3 and FIG. 4 are contour line diagrams generated from the block matching difference calculated in different examples, wherein the x-axis and the y-axis represent the horizontal direction and the vertical direction, respectively. The points in the same dotted line of FIG. 3 represent the reference image blocks corresponding to the target image block having the same block matching difference. In this figure, for example, the dotted line of the innermost circle represents that the plurality of block matching differences are similar to the minimum block matching difference $D_{min}$ and of the same value. All the dotted lines in the figure show a wave trough, and the direction indicated by the arrow is the method of performing the block matching search to find the minimum block matching difference $D_{min}$. The example shown in FIG. 4 finds 2 wave troughs, and obtaining the cross-sectional view of the 2 wave troughs shows in FIG. 5 and FIG. 6. To make the descriptions easily appreciable, only the curves obtained by performing a cross-sectional view on the contour line related to the plurality of block matching differences are illustrated; it should be noted here, regarding performing a vertical cross-sectional view, a horizontal cross-sectional view or any direction of cross-sectional view can be utilized for explaining how to find the block matching difference of the real motion direction of the target image block MB; the curves of FIG. 5 and FIG. 6 are assumed to be obtained by performing a horizontal cross-sectional view on the contour.

Figure 5:
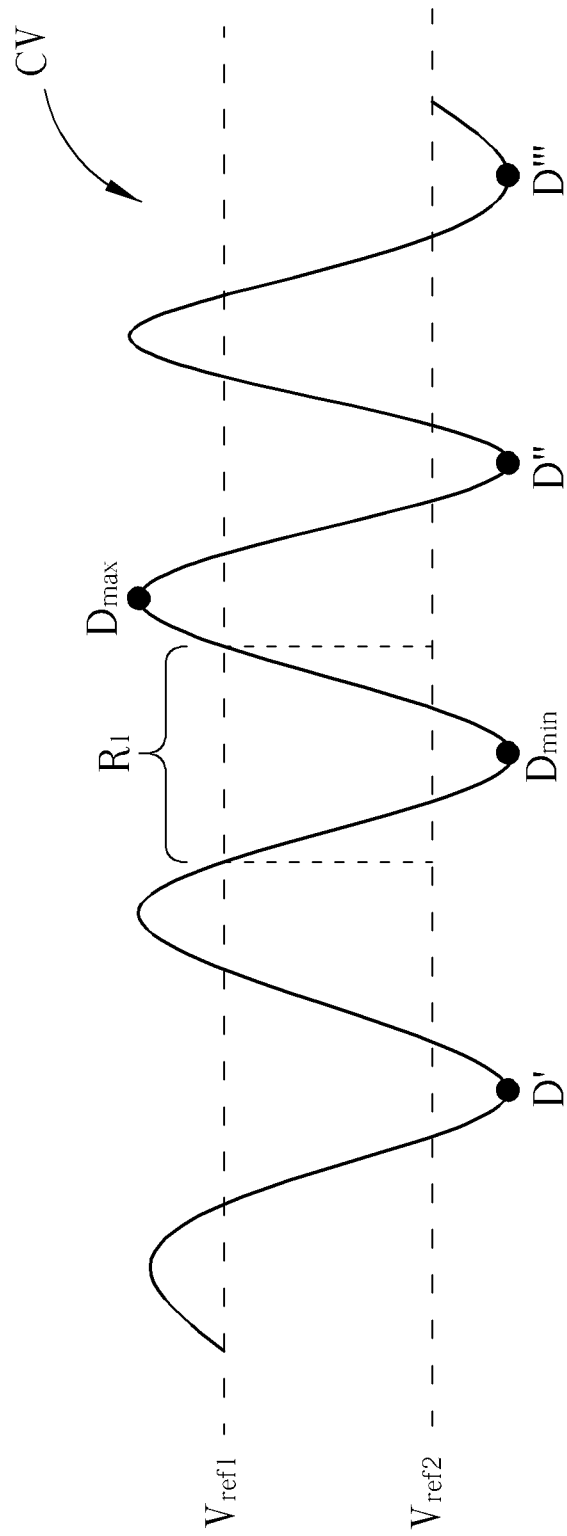
FIG. 5 is a diagram of a curve CV obtained by performing a cross-sectional view on the contour formed from the block matching differences $D_1 \sim D_n$.
Figure 6:
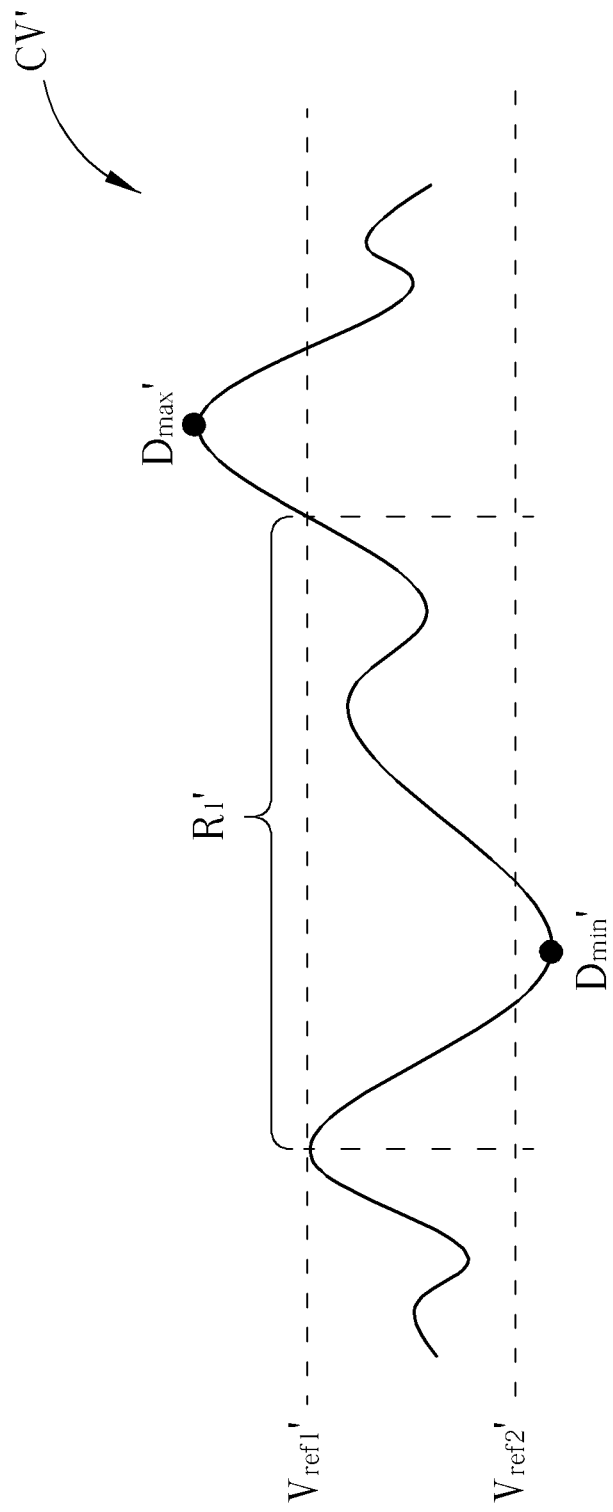
FIG. 6 is a diagram of the curve CV obtained by performing a cross-sectional view on the contour formed from the block matching differences $D_1 \sim D_n$ according to another embodiment.

Please refer to FIG. 5. FIG. 5 is a diagram of the curve CV obtained by performing the cross-sectional view on the contour formed from the block matching differences $D_1 \sim D_n$. As shown in FIG. 5, the curve CV has a plurality of values similar to the minimum block matching difference $D_{min}$, such as D', D" and D'". In other words, as shown in FIG. 5, there are at least 4 wave troughs. To detect the situation correctly, the motion estimation circuit 105 obtains the minimum block matching difference $D_{min}$ first (as shown in the diagram), then the comparison circuit 110 selects a specific block matching difference from the block matching differences $D_1 \sim D_n$. For example, the specific block matching difference can be equal to the maximum block matching difference $D_{max}$. Then, the comparison circuit 110 determines the reference values $V_{ref1}$ and $V_{ref2}$ according to the specific block matching difference (the maximum block matching difference $D_{max}$) and the minimum block matching difference $D_{min}$; the reference value $V_{ref1}$ is used for defining the position of the image block comprised by the first range mentioned above, and the reference value $V_{ref2}$ is used for defining whether there is a block matching difference similar to the minimum block matching difference $D_{min}$. For example, the reference value $V_{ref1}$ is designed to be ¾ of the difference between the maximum block matching difference $D_{max}$ and the minimum block matching difference $D_{min}$, and the reference value $V_{ref2}$ is designed to be ¼ of the difference between the maximum block matching difference $D_{max}$ and the minimum block matching difference $D_{min}$, and all the block matching differences corresponding to any position of the image block within the first range are simultaneously designed to be less than or equal to the reference value $V_{ref1}$ and less than the minimum block matching difference $D_{min}$. In other words, the image block within the first range will be the image block corresponding to all block matching differences in the difference range $R_1$. All the image blocks within the first range individually correspond to the block matching differences in the difference range $R_1$, and then the comparison circuit 110 can compare the reference block matching differences outside the range $R_1$ with the minimum block matching difference $D_{min}$ for detecting whether there are values similar to the minimum block matching difference $D_{min}$. In the example mentioned above, the comparison circuit 110 detects whether the reference block matching difference outside the range $R_1$ is less than the reference value $V_{ref2}$. If there is at least a reference block matching difference less than the reference value $V_{ref2}$ such as D', D" or D'" shown in FIG. 5, then the motion vector corresponding to the minimum block matching difference $D_{min}$ calculated before is possible an untrustworthy motion vector and should not be chosen as the final motion vector MV. The reason is the motion vector corresponding to the minimum block matching difference $D_{min}$ may not be the real motion direction of the image object of the target image block MB.

In addition, the reference value $V_{ref1}$ and the reference value $V_{ref2}$ do not need to be designed according to the difference between $D_{max}$ and $D_{min}$; that is, the values of $V_{ref1}$ can be altered according to an predetermined value or determined by the rule of experience, and any method used for determining the first range mentioned above and detecting whether there are block matching differences similar to the minimum block matching difference $D_{min}$ can be included in this invention.

The reason for selecting the reference block matching difference corresponding to the position of the image block outside the first range to perform comparison with the minimum block matching difference $D_{min}$ is that this prevents selecting the block matching differences too near $D_{min}$ thereby causing a wrong decision. For example, please refer to FIG. 6. FIG. 6 is a diagram of the curve CV' obtained by performing a cross-sectional view on the contours formed from the block matching differences $D_1 \sim D_n$ according to another embodiment. As shown in the curve CV', the minimum block matching difference $D_{min}$ and the side block matching differences are calculated gradually according to a certain scan line moving 1 pixel each time. As a result, no matter whether a plurality of similar/same patterns exist, the minimum block matching difference $D_{min}$ and the side block matching differences are usually very close, so the comparison circuit 110 in FIG. 1 needs to determine the first range and select the block matching differences outside the first range in order to perform comparison with the minimum block matching difference $D_{min}$, for preventing a wrong decision. Taking the example of FIG. 6, as the position of the image block comprised by the first range now corresponds to the block matching differences of the difference range R1' and the values outside the difference range R1' are all greater than the reference value Vref2' calculated according to the method mentioned above., the method should be capable of directly selecting the motion vector corresponding to the minimum block matching difference $D_{min}$' as the target motion vector of a target image block. However, if the comparison circuit 110 directly selects all block matching differences $D_1 \sim D_n$ including the block matching differences inside the difference range R1' to perform comparison with the minimum block matching difference $D_{min}$, then it is possible that the comparison circuit 110 will detect the minimum block matching difference $D_{min}$' to be similar to the side image block and determine the minimum block matching difference $D_{min}$' to be an untrustworthy motion vector. But in fact, the minimum block matching difference $D_{min}$' is a true motion vector.

The decision circuit 115 is used for determining the target motion vector MV of the target image block MB. Please refer to the curve CV in the FIG. 5. When the comparison result $R_{comp}$ means that the difference of the minimum block matching difference $D_{min}$ and at least a reference block matching difference outside the difference range $R_1$' is less than the reference value $V_{ref2}$ or equal to the reference value $V_{ref2}$, the motion vector corresponding to the minimum block matching difference $D_{min}$ is determined as an untrustworthy motion vector, so the decision unit 115 will refer to at least a motion vector of the neighboring image block of the target image block MB in order to obtain the target motion vector MV of the target image block MB (or directly utilize the motion vector of one neighboring image block as the target motion vector MV). This is because the two neighboring image blocks usually correspond to the same image object, so when the motion vector determined by the minimum block matching difference $D_{min}$ is untrustworthy, the method would refer to the motion vector of the neighboring image block to determine the target motion vector MV of the target image block MB. For example, the decision unit 115 is capable of comparing the plurality of block matching differences corresponding to the plurality of motion vectors of the surrounding neighboring image blocks, selecting a specific block matching difference such as the minimum block matching difference from the plurality of the block matching differences, then determining the motion vector corresponding to the specific block matching difference as the target motion vector MV of the target image block MB. Of course, other methods to determine the target motion vector by referring to the motion vector of the neighboring image block also apply to the invention. When the comparison result $R_{comp}$ refers to the difference of the minimum block matching difference $D_{min}$, and all reference block matching differences outside the difference range $R_1$ are all greater than the reference value $V_{ref2}$, the decision unit 115 directly determines that the motion vector corresponding to the minimum block matching difference $D_{min}$ is the target motion vector MV.

In addition, the first range mentioned above in other embodiment is also capable of being designed as a fixed range, such as utilizing the minimum block matching difference $D_{min}$ as the center of the 16×16 pixel space range; this modification is also within the scope of this invention. Then, in another embodiment, the comparison circuit 110 is also capable of utilizing the reference value $V_{ref1}$ and the minimum block matching difference $D_{min}$ as the upper limitation and the lower limitation, respectively, to determine a preliminary range, where the block matching difference corresponding to the position of any image block in the preliminary range outside the difference range $R_1$' is not greater than the reference value $V_{ref1}$ and not less than the minimum block matching difference $D_{min}$, and then further utilizing a fixed range corresponding to the preliminary range and the position of the image block of the minimum block matching difference $D_{min}$ such as the 16×16 pixel range mentioned above in order to determine an overlapped range as the first range; this design also complies with the spirit of the invention.

Figure 7:
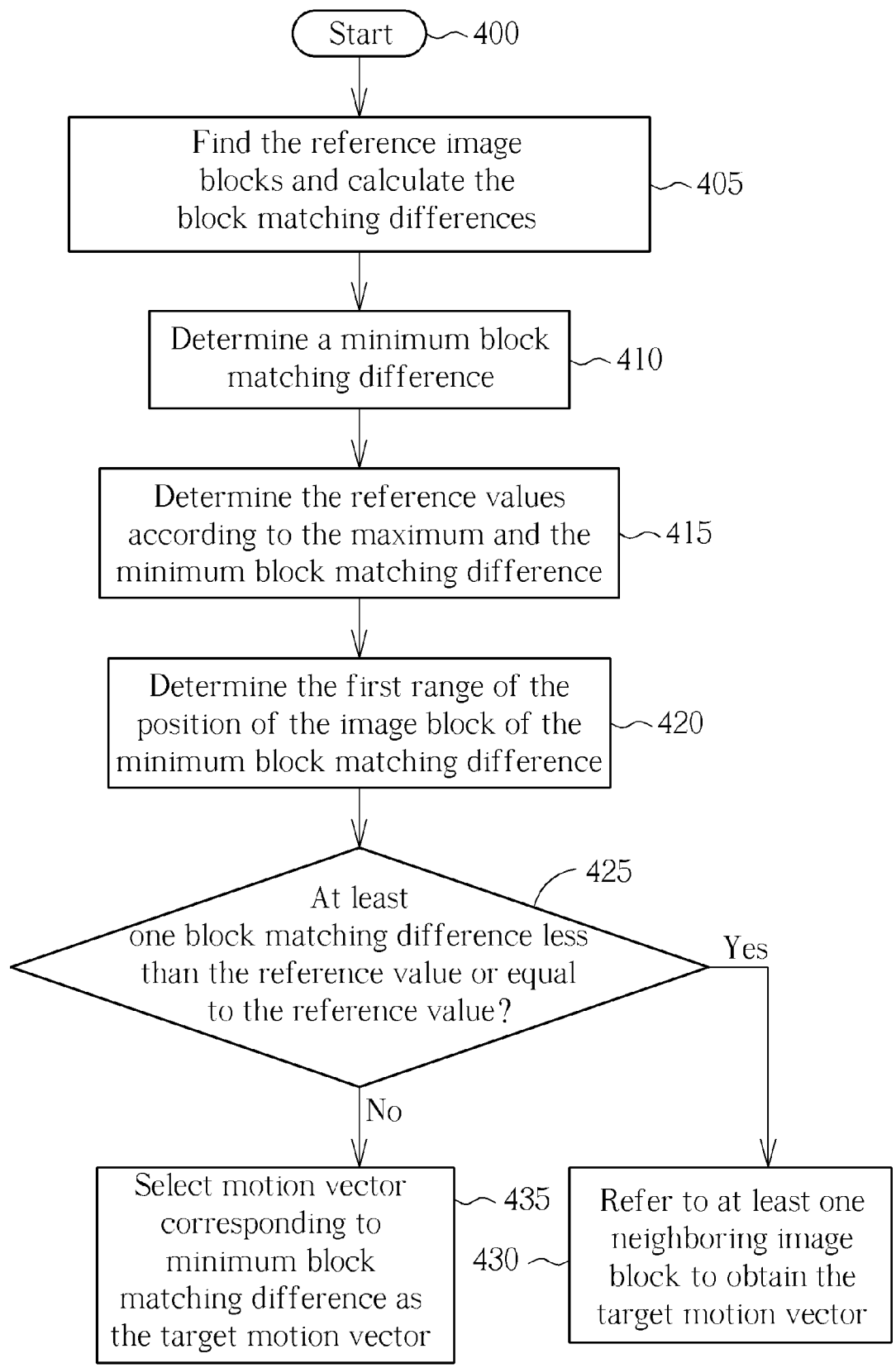
FIG. 7 is a flowchart of the video processing device shown in FIG. 1.

Finally, to make the spirit of the present invention easily understandable, FIG. 7 illustrates the operation flow of the video processing device 100 of FIG. 1. The detailed description is illustrated as follows:

Step 400: Start.

Step 405: Let the image blocks to be the base for performing a full search to find the reference image blocks $MB_1 \sim MB_n$ and calculate the block matching differences $D_1 \sim D_n$ according to the target image block MB.

Step 410: Determine a minimum block matching difference $D_{min}$ from the block matching differences $D_1 \sim D_n$.

Step 415: Determine the reference values $V_{ref1}$ and $V_{ref2}$ according to the maximum block matching difference $D_{max}$ and the minimum block matching difference $D_{min}$.

Step 420: Determine the first range of the position of the image block of the minimum block matching difference $D_{min}$ according to the reference value $V_{ref1}$ and the minimum block matching difference $D_{min}$.

Step 425: Is there at least one block matching difference corresponding to the position of the image block outside the first range less than the reference value $V_{ref2}$ or equal to the reference value $V_{ref2}$? If yes, then determine the motion vector corresponding to the minimum block matching difference $D_{min}$ as un-real and continue to perform STEP 430; if no, then continue to perform STEP 435.

Step 430: Refer to at least one neighboring image block to obtain the target motion vector MV of the target image block MB.

Step 435: Select the motion vector corresponding to the minimum block matching difference $D_{min}$ as the target motion vector MV of the target image block MB.

Those skilled in the art will readily observe that numerous modifications and alterations of the device and method may be made while retaining the teachings of the invention.

What is claimed is:

1. A method of determining a motion vector of a target image block, comprising:
    performing motion estimation upon the target image block and a plurality of reference image blocks to calculate a plurality of block matching differences;
    determining a minimum block matching difference from the plurality of the block matching differences;
    comparing the minimum block matching difference with at least one of the reference block matching differences to obtain at least a comparison result; and
    according to the at least a comparison result, selectively determining a target motion vector of the target image block referred to a motion vector of at least a neighboring image block of the target image block or a motion vector corresponding to the minimum block matching difference wherein when the comparison result shows that the difference of the minimum block matching difference and the reference block matching difference is not greater than a second reference value, a decision circuit determines to utilize the motion vector of at least a neighboring image block to generate the target motion vector of the target image block, else determines to utilize the motion vector corresponding to the minimum block matching difference as the target motion vector of the target image block;
    wherein the method is used in motion interpolation for frame rate conversion; the reference image blocks are located outside a first range corresponding to the reference image block of the minimum block matching difference, a first reference value is determined by the maximum block matching difference and the minimum block matching difference of the plurality of block matching differences, and the first reference value is used for defining a position of an image block included by the first range.

2. The method of claim 1, wherein any of the reference block matching differences is not greater than the first reference value and not less than the minimum block matching difference.

3. The method of claim 1, wherein the second reference value is determined by the minimum block matching difference of the plurality of block matching differences.

4. A video processing device comprising:
    a motion estimation circuit, for performing motion estimation upon a target image block and a plurality of reference image blocks to calculate a plurality of block matching differences, and determining a minimum block matching difference;
    a comparison circuit, coupled to the motion estimation circuit, for comparing the minimum block matching difference and at least one of the reference block matching differences to obtain at least a comparison result; and
    a decision circuit, coupled to the comparison circuit, for according to the comparison result, selectively determining a target motion vector of the target image block referred to a motion vector of at least a neighboring image block of the target image block or a motion vector corresponding to the minimum block matching difference wherein when the comparison result shows that the difference of the minimum block matching difference and the reference block matching difference is not greater than a second reference value, the decision circuit determines to utilize the motion vector of the neighboring image block to generate the target motion vector of the target image block, else determines to utilize the motion vector corresponding to the minimum block matching difference as the target motion vector of the target image block;
    wherein the video processing device is used in motion interpolation for frame rate conversion; the reference image blocks are located outside a first range corresponding to the reference image block of the minimum block matching difference; a first reference value is determined by the maximum block matching difference and the minimum block matching difference of the plurality of the block matching differences; and the first reference value is used for defining a position of an image block included by the first range.

5. The device of claim 4, wherein any of the reference block matching differences is not greater than the first reference value and not less than the minimum block matching difference.

6. The device of claim 5, wherein the second reference value is determined by the minimum block matching difference of the plurality of the block matching differences.

7. A method of determining a motion vector of a target image block, comprising:
    performing full search motion estimation upon the target image block and a plurality of reference image blocks to calculate a plurality of block matching differences;
    determining a minimum block matching difference from the plurality of the block matching differences;
    determining a first reference value and a second reference value according to a maximum block matching difference and the minimum block matching difference;
    determining a first range of a position of an image block of the minimum block matching difference according to the first reference value and the minimum block matching difference;
    determining whether at least one block matching difference corresponding to the position of the image block outside the first range is less than or equal to the second reference value, to generate a comparison result; and
    according to a comparison result, selectively determining a target motion vector of the target image block referred to a motion vector of at least a neighboring image block of the target image block or a motion vector corresponding to the minimum block matching difference;
    wherein the first reference value is used for defining a position of an image block included by the first range.

* * * * *